United States Patent
Korsa et al.

(10) Patent No.: US 11,640,285 B2
(45) Date of Patent: *May 2, 2023

(54) METHOD OF USING MULTIDIMENSIONAL BLOCKIFICATION TO OPTIMIZE COMPUTER PROGRAM AND DEVICE THEREOF

(71) Applicant: Blaize, Inc., El Dorado Hills, CA (US)

(72) Inventors: Ravi Korsa, Telangana (IN); Aravind Rajulapudi, Hyderabad (IN); Pathikonda Datta Nagraj, Pradesh (IN)

(73) Assignee: Blaize, Inc., El Dorado Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,310

(22) Filed: Apr. 5, 2022

(65) Prior Publication Data

US 2022/0229643 A1 Jul. 21, 2022

Related U.S. Application Data

(63) Continuation of application No. 16/994,082, filed on Aug. 14, 2020, now Pat. No. 11,327,733.

(51) Int. Cl.
*G06F 8/41* (2018.01)
*G06F 9/30* (2018.01)
(Continued)

(52) U.S. Cl.
CPC ............ *G06F 8/4441* (2013.01); *G06F 8/447* (2013.01); *G06F 9/30036* (2013.01); *G06F 9/30105* (2013.01); *G06F 9/30138* (2013.01); *G06F 9/3853* (2013.01); *G06F 9/3887* (2013.01); *G06F 9/4411* (2013.01); *G06F 9/5016* (2013.01)

(58) Field of Classification Search
CPC .... G06F 8/4441; G06F 8/447; G06F 9/30036; G06F 9/3853; G06F 9/3887
See application file for complete search history.

(56) References Cited

U.S. PATENT DOCUMENTS

| | | |
|---|---|---|
| 5,487,137 A | 1/1996 | Matsuhira |
| 5,511,198 A | 4/1996 | Hotta |
| | (Continued) | |

FOREIGN PATENT DOCUMENTS

EP 0785506 7/1997

*Primary Examiner* — Ziaul A Chowdhury
(74) *Attorney, Agent, or Firm* — Brian R. Short

(57) ABSTRACT

Disclosed embodiments relate to a method and device for optimizing compilation of source code. The proposed method receives a first intermediate representation code of a source code and analyses each basic block instruction of the plurality of basic block instructions contained in the first intermediate representation code for blockification. In order to blockify the identical instructions, the one or more groups of basic block instructions are assessed for eligibility of blockification. Upon determining as eligible, the group of basic block instructions are blockified using one of one dimensional SIMD vectorization and two-dimensional SIMD vectorization. The method further generates a second intermediate representation of the source code which is translated to executable target code with more efficient processing capacity.

9 Claims, 5 Drawing Sheets

(51) Int. Cl.
*G06F 9/38* (2018.01)
*G06F 9/4401* (2018.01)
*G06F 9/50* (2006.01)

(56) References Cited

U.S. PATENT DOCUMENTS

| | | | |
|---|---|---|---|
| 6,094,637 A * | 7/2000 | Hong | G10L 19/04 |
| | | | 712/222 |
| 6,289,505 B1 | 9/2001 | Goebel | |
| 7,543,284 B2 | 6/2009 | Bolton et al. | |
| 8,726,281 B2 * | 5/2014 | Raghavan | G06F 8/4432 |
| | | | 718/101 |
| 10,289,816 B1 | 5/2019 | Malassenet et al. | |
| 2003/0079208 A1 | 4/2003 | Willis | |
| 2014/0344555 A1 * | 11/2014 | Ramanarayanan | G06F 8/40 |
| | | | 712/222 |
| 2016/0364216 A1 | 12/2016 | Howes | |
| 2017/0097825 A1 * | 4/2017 | Lo | G06F 9/30007 |

* cited by examiner

METHOD OF USING MULTIDIMENSIONAL BLOCKIFICATION TO OPTIMIZE COMPUTER PROGRAM AND DEVICE THEREOF

RELATED APPLICATIONS

This patent application is a continuation of U.S. patent application Ser. No. 16/994,083, filed Aug. 14, 2020, which claims priority to India Patent Application Serial No. 202041022228, filed May 27, 2020, which are herein incorporated by reference.

FIELD OF THE EMBODIMENTS

The present disclosure relates to computing systems in general and more particularly, to compilers that generate executable code for computer systems.

BACKGROUND

Modern computer systems have evolved into extremely powerful computing devices with advances in both hardware and software. With advances in technologies and applications, software used in the modern computer systems became very complex when compared to early computer software. Many modern computer software's have millions of lines of instructions to achieve an advanced functionality of the software. The execution time of the computer software or computer program is closely associated with the complexity and number of instructions that are executed while running the computer program. Thus, as the complexity and number of instructions increase, the execution time of the computer program also increases proportionately. Computer programs are generally written in high level language and converted into a stream of machine code instructions that are eventually executed on the computer system by a compiler. The manner in which the compiler converts the source code to a target code affects the execution time of the computer program. If the target code involves a repetition of unnecessary operations, it will slow the execution speed of the program. In order to reduce the repetition of one or more unnecessary operations, one dimensional vectorization or single instructions multiple data (SIMD) has been introduced. However, the problem with the one-dimensional vectorization is that two adjacent pixel data in adjacent rows one below another will be processed in separate instances due to storage of the two adjacent pixel data different memory locations. Thus, in order to process the two adjacent pixel data, there will be repetition of one or more operation and/or instructions which will increase the processing time of computer program thus causing delay in the output.

Thus, it is desirous to have an optimized compiler that is capable eliminating repetition of unnecessary operations thereby reducing the execution time of the computer program.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a computer implemented method of optimizing compilation of source code. The method includes receiving a first intermediate representation code of the source code as input data. In one aspect, the first intermediate representation code comprises a plurality of basic block (BB) instructions generated from the corresponding source code. The method further includes analysing each of the plurality of BB instructions to determine one or more groups of identical BB instructions that satisfy at least one criteria for blockification. The method also includes generating, based on the determination, a second intermediate representation code by blockification of at least one of one or more groups of identical BB instructions in the first intermediate representation code. The method also includes compiling the second intermediate representation code to obtain a corresponding optimized executable code for executing the source code.

Further, the disclosure relates to a device to optimize the compilation of source code. The device comprises a memory and a processor coupled with the memory, wherein the memory stores processor-executable instructions which on execution cause the processor to receive a first intermediate representation code of the source code. In an aspect, the first intermediate representation comprises a plurality of basic block (BB) instructions. The processor further determines one or more groups of identical BB instructions upon analysing each BB instructions based on criteria for blockification and generates a second intermediate representation of the source code by blockifying the one or more groups of identical BB instructions. The processor generates an optimized executable code corresponding to the source code by compiling the second intermediate representation code.

The foregoing summary is illustrative only and is not intended to be in anyway limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

Figures 1, 2:
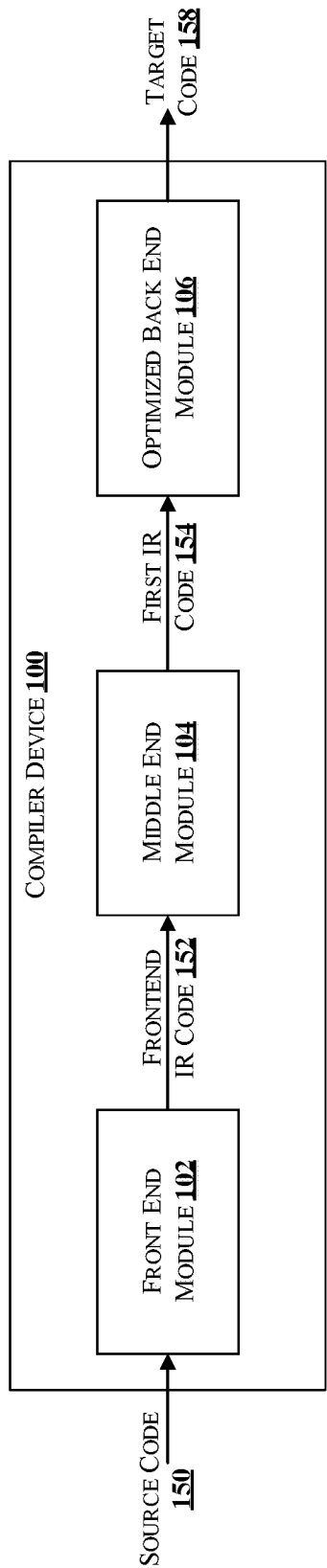
FIG. 1 illustrates an exemplary overview block diagram of a compiler device in accordance with an embodiment of the present disclosure.
FIG. 2 illustrates an exemplary representation of scalar operation and two-dimensional SIMD operation in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", "include(s)", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Disclosed embodiments relate to a method and device for optimizing compilation of source code. The proposed method receives a first intermediate representation code of a source code, identifies a plurality of basic block instructions in the first intermediate representation code and groups the identical basic block instructions. Each group of the identical basic block instructions are blockified using one of one dimensional SIMD vectorization and two-dimensional SIMD vectorization based on eligibility of blockification. The method further generates a second intermediate representation of the source code which is translated to executable target code with more efficient processing capacity. The target code generated from the second IR code includes lesser number of instructions, requiring lesser execution time, improved bandwidth utilization, and improved arithmetic and logical unit (ALU) efficiency.

FIG. 1 illustrates an exemplary overview block diagram of compiler device 100 in accordance with an embodiment of the present disclosure. As shown in FIG. 1, the compiler device 100 includes one or more modules such as a frontend module 102, a middle end module 104, and an optimized back end module 106. The frontend module 102 comprises one or more sub-modules including a lexical analyzer, a syntax analyzer, a semantic analyzer, and an intermediate code generator. The frontend module 102 transforms a source code 150 into a frontend intermediate representation (IR) code 152 for further processing by the middle end module 104. The middle end module 104 comprises a code optimizer which performs optimization on the frontend IR code 152 in order to improve the performance and quality of a target code 158. The middle end module 104 commonly transforms the frontend IR code 152 into a first IR code 154 such that the first IR code 154 consumes fewer resources and produces more speed. The optimized back end module 106 comprises a target code generator that converts the first IR code 154 into a second IR code (not shown) when the first IR code 154 includes one or more group of identical basic block (BB) instructions that satisfy one or more criteria for blockification process. The target code generator further converts the second IR code into the target code 158 based on target CPU architecture. The target code 158 when executed on the target CPU requires lesser compilation time and lesser computing capacity. In one example, the target CPU architecture may be quad core processor having 128 SIMD registers.

The optimized backend module 106 scans each instruction of the first IR code 154 to determine whether one or more criteria is satisfied for blockification and generates the blockified instructions also referred as two-dimensional Single Instruction Multiple Data (SIMD) instructions. Two-dimensional SIMD instructions provides a form of vectorization where a large machine word is perceived as a vector of sub words and the same operation is performed on all sub words in parallel. Two-dimensional SIMD operations can be used for 3D graphics, audio/visual processing in multimedia applications, in neural networks for object detection, and other artificial intelligence applications.

FIG. 2 illustrates an exemplary representation of two-dimensional SIMD operation performed using the optimized backend module of FIG. 1 and comparison with scalar operation in accordance with some embodiment of the present disclosure.

As shown in FIG. 2, for an example, the source code 150 may be designed to read 4 elements from two images A and B, add each element of A with each element of B, and input the result to the third image C. Each element of the images A, B, and C is represented as two varying co-ordinates. Thus, an optimization process of the present invention implements two-dimensional SIMD for better efficiency. Upon compilation of the source code 150 by the optimized backend module 106, the second intermediate representation (IR) code is generated by reducing the number of instructions to 1 LOAD instruction for first image A, 1 LOAD instruction for second image B, 1 ADD instruction for addition, and 1 STORE instruction to write result to the third image C. In contrast, conventional scalar operation requires 4 LOAD instructions for first image A, 4 LOAD instructions for second image B, 4 ADD instructions for addition, and 4 STORE instructions to write result to the third image C.

The optimized module 106 implements the two-dimensional SIMD operations which are particularly useful in image processing applications, where an image is decomposed into plurality of pixels. Further, the optimized backend module 106 in the present disclosure uses both two dimensional and one-dimensional vectorizations also known as blockification as per the program need while processing a big volume of data points to ascertain maximum efficiency during the execution of the target code 158 generated based on the blockification process. Blockification is the process of combining a group of identical instructions represented in the first IR code 154 to generate the second IR code corresponding to the source code 150.

Figure 3:
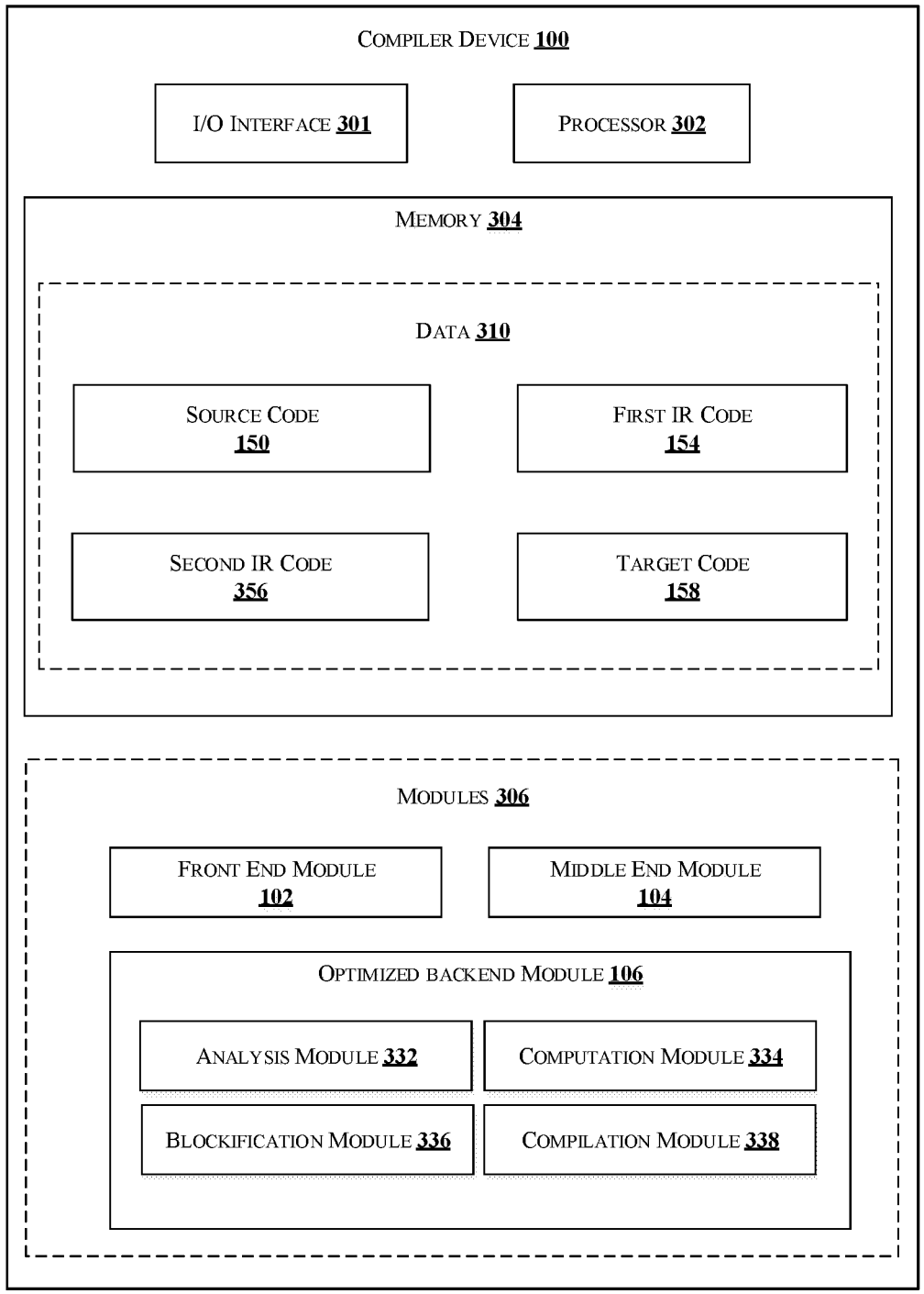
FIG. 3 depicts an exemplary block diagram of the compiler device in accordance with some embodiments of the present disclosure.

FIG. 3 illustrates an exemplary block diagram of the compiler device to optimize compilation of source code, in accordance with some embodiments of the present disclosure.

In one embodiment, the compiler device 100 may be a typical compiler as illustrated in FIG. 3. In an implementation, the compiler device 100 may include an I/O interface 301, a processor 302, a memory 304, and one or more modules 306. The I/O interface 301 may be configured to communicate with one or more input devices. Further, the I/O interface 301 may be configured to communicate with one or more output devices. The processor 302 may be configured to perform one or more functions of the compiler device 100 for optimizing compilation of the source code 150. In some implementations, the one or more modules 306 may be configured to perform various operations in accordance with embodiments of the present disclosure. The modules 306 include the front end module 102, the middle end module 104, and the optimized back end module 106. The optimized back end module 106 comprises an analysis module 332, a computation module 334, a blockification module 336, and a compilation module 338. The modules may further include other modules to perform various miscellaneous functionalities of the compiler device 100. It will be appreciated that such aforementioned modules may be represented as a single module or combination of different modules. The modules 306 may be implemented in the form of system software performed by the processor 302.

The memory 304 may be communicatively coupled to the processor 302 and may store data 310 and other related data. In an embodiment, data 310 may be stored with the memory 304 and may include, without limiting to the source code 150, the first IR code 154, a second IR code 356, and the target code 158.

The first IR code 154 is referred to the received IR code, wherein the IR code can be received from the middle end module 104 of the compiler. The second IR code 356 is referred to the blockified IR code generated by the compiler device 100. The other related data may also be referred as reference data for storing the intermediate data, temporary data during the process of optimization.

In operation, the compiler device 100 enables optimization of the first IR code 154 by applying the process of blockification. In one embodiment, the analysis module 332 scans each of the plurality of basic block (BB) instructions, contained in the received first IR code 154 from the middle end module 104, and determines one or more group of identical BB instructions. The BB instructions may be for example, one of LOAD, Arithmetic Logic and Multiply (ALM), and STORE instructions. In one embodiment, the one or more group of identical BB instructions are determined based on BB instruction identifier and allotted buffer. In one example, BB identifier can be at least one of LOAD identifier, ALM identifier, and STORE identifier. BB instructions bearing the same BB identifier are determined to be identical BB instructions. The analysis module 332 determines the one or more group of identical BB instructions based on the BB identifier for blockification process.

In one embodiment, the computation module 334 determines one or more criteria to blockify one or more groups of identical BB instructions. The computation module 334 determines as to whether the one or more groups of identical BB instructions meet the one or more criteria to undergo blockification process based on area computed for each group of identical BB instructions. In one embodiment, the computation module 334 determines the area for each group of identical BB instructions based on a minimum and a maximum offset determined for each group of identical BB instructions. The computation module 334 further compares the computed area with the total size or number of identical BB instructions in each group and determines the eligibility of the group of BB instructions for blockification based on the comparison. In an exemplary embodiment, the computation module 334 determines that the group of BB instructions are eligible for blockification when a difference between the computed area and a total number of identical instructions in each group is less than a predefined threshold.

In one embodiment, the blockification module 336 merges the at least one of one or more groups of identical BB instructions using one of one dimensional SIMD vectorization and two-dimensional SIMD vectorization and generates the second IR code 356. The blockification module 336 merges the at least one of one or more groups of identical BB instructions by using one or more vector instructions. In one embodiment, the blockification module 336 generates the one or more vector instructions for each group of identical BB instructions based on the SIMD width of the vector register. Upon successful merging of the at least one of one or more groups of identical BB instructions, the blockification module 336 generates the second IR code 356. The compilation module 338 then receives the second IR code 356 and translates the second IR code 356 to obtain a corresponding executable target code 158 for execution of the source code 152. In certain embodiments, the compilation module 338 is also referred to as target code generation module.

Figure 4:
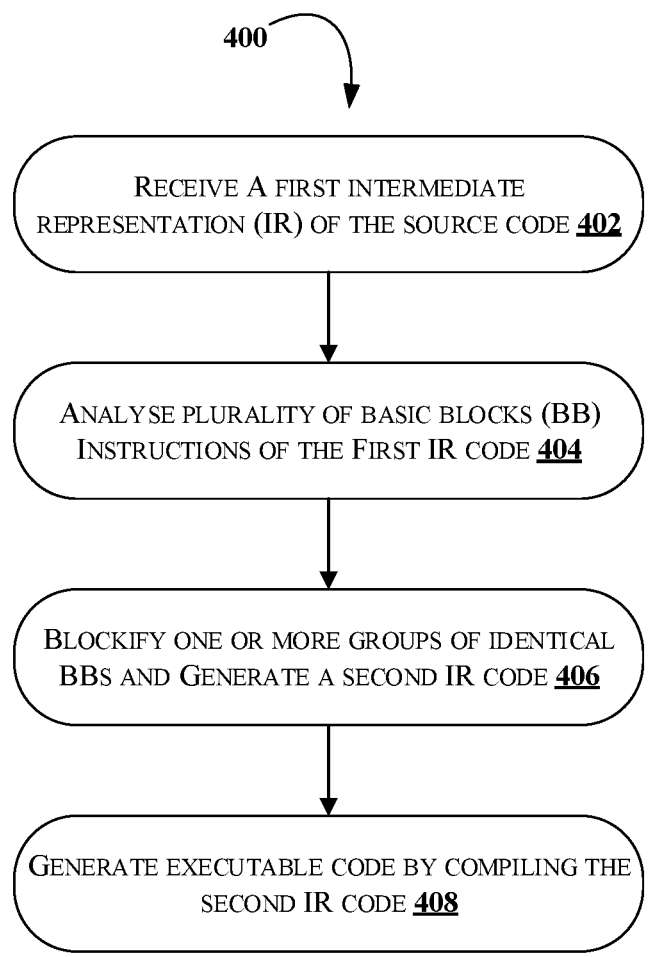
FIG. 4 illustrates a flowchart of an exemplary method of enabling optimization of compilation process in accordance with some embodiments of the present disclosure.

FIG. 4 illustrates a flow chart of an exemplary method of enabling optimization of compilation process in accordance with some embodiments of the present disclosure; and the method 400 comprises one or more blocks implemented by the compiler device 100 for enabling optimization of compilation process. The method 400 may be described in the general context of a computer processor executable instructions. Generally, computer processor executable instructions can include scalar instructions, vector instructions, comparison and selection-based instructions etc.

The order in which the method 400 is described in not intended to be construed as a limitation, and any number of the described method blocks can be combined in any order to implement the method 400. Additionally, individual blocks may be deleted from the method 400 without departing from the spirit and scope of the subject matter described herein. Furthermore, the method 400 can be implemented in any suitable hardware having parallel processing capability, software executed by a processor, firmware, or combination thereof.

At block 402, the first intermediate representation (IR) code 154 of the source code 150 is received by the optimized backend 106. The first IR code 154 is generated after performing lexical analysis, syntactical analysis, semantic analysis, and initial optimization on the source code. Usually, the first IR code 154 includes a plurality of basic block (BB) instructions equivalent to the source code 150 having same functional objective. Upon receiving the first IR code 154 of the source code 150, the compiler device 100 initiates the analysis process of the first IR code 154.

At block 404, each of the plurality of BB instructions are analysed and one or more groups of identical BB instructions that satisfy at least one criteria for blockification are determined by the compiler device 100, where each BB instructions is one of LOAD, Arithmetic Logic Multiply (ALM), and STORE instructions. The analysis module 332 determines one or more groups of identical instructions that satisfy at least one criteria for blockification by identifying a minimum offset and a maximum offset for each group of identical BB instructions. In one embodiment, the minimum offset is an minimum location or first location of a vector register and the maximum location or last location of the vector register. The computation module 334 computes an area for each group of identical BB instructions based on the minimum offset and the maximum offset identified. The computation module 334 also determines whether each group of identical BB instructions satisfies the criteria for blockification when a difference between the computed area and a total number of identical instructions in each group is less than a threshold. In one embodiment, the step of blockification includes merging one or more groups of identical BB instructions using one of one-dimensional SIMD vectorization and two-dimensional SIMD vectorization. In another embodiment, merging the at least one of one or more groups of identical BB instructions comprises generating one or more vector instructions for each group of identical instructions using one of one-dimensional SIMD vectorization and two-dimensional SIMD vectorization. The number of one or more vector instructions generated can be varied based on SIMD width of a vector register.

At block 406, a second intermediate representation code is generated by blockification of at least one of one or more groups of identical BB instructions in the first intermediate representation code. In one embodiment, blockification includes merging one or more group of identical BB instructions to one or more vector instructions using one-dimensional SIMD vectorization and two-dimensional SIMD vectorization. The blockification module 336 generates the second IR code 356 also known as one or more vector instructions based on SIMD width of a vector register in the memory 304.

At block 408, the second IR code is compiled by the compilation module 338 to generate an executable target code 158 from the second IR code 356. The target code 158 is generated based on target CPU architecture. The target code 158 when executed on the target CPU requires lesser compilation time and lesser computing capacity. In one example, the target CPU architecture may be quad core processor having 128 SIMD registers.

Figure 5:
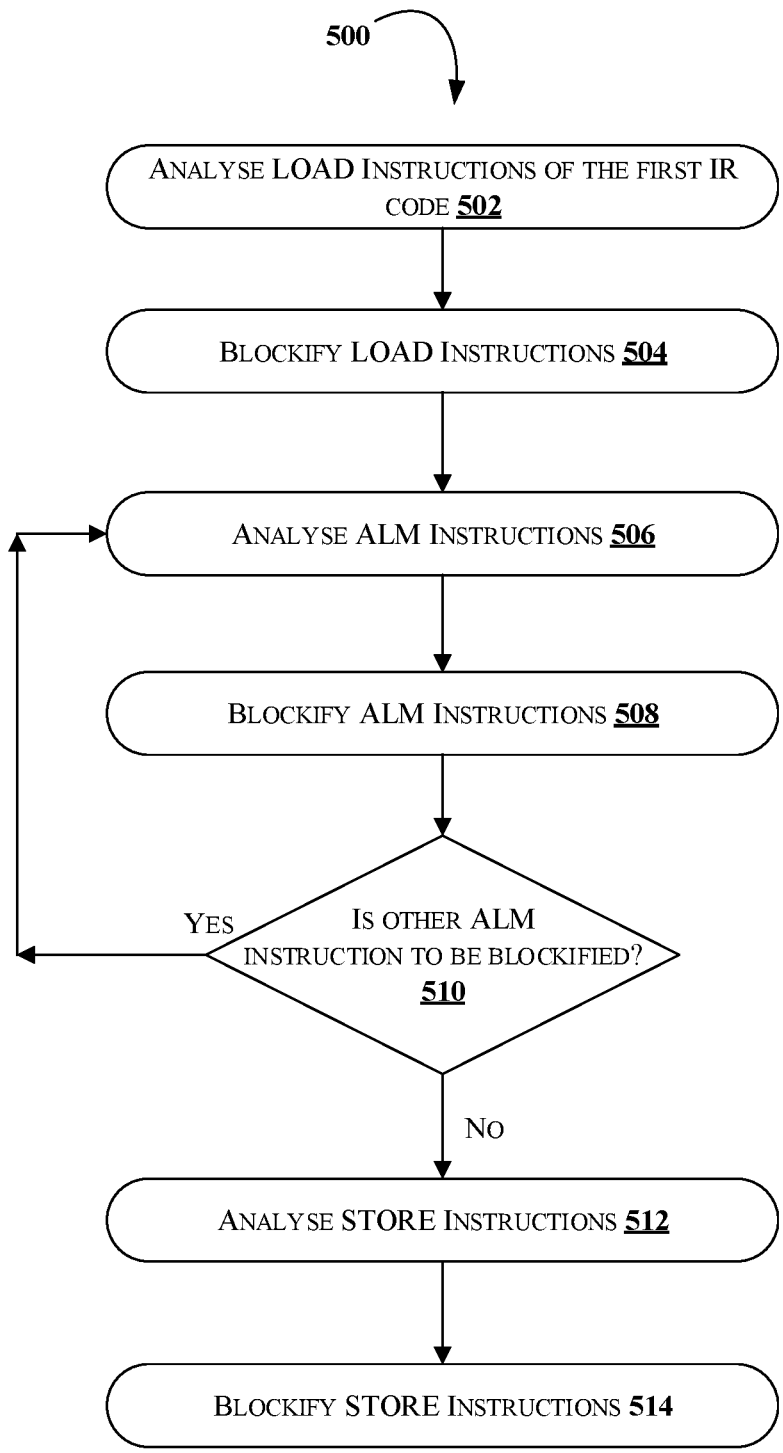
FIG. 5 illustrates a flowchart of an exemplary method of blockification in accordance with an embodiment of the present disclosure.

FIG. 5 is a flowchart of an exemplary method of blockification of an input IR code for implementing embodiments consistent with the present disclosure.

A source code usually performs three major categories of operations i.e. loading data from memory, processing such loaded data, and storing the processed data back to memory. Accordingly, a source code comprises one or more syntaxes which are capable of executing the aforementioned operations. In the compilation process, the middle end 104 generates an IR code which is functionally equivalent to the input source code, wherein the IR code includes the instructions like LOAD, ALM, and STORE. The first IR code 324 is passed through the first analysis block 502 where the LOAD instructions are analysed for blockification based on the occurrence and eligibility of the LOAD instructions in the first IR code 324. At block 504, eligible LOAD instructions by using one of one dimensional SIMD and two-dimensional SIMD vectorization are blockified by the compiler device 100.

At block 506, the first IR code 154 with blockified LOAD instructions is further analysed for arithmetic logic multiply (ALM) instructions to determine the blockification eligibility of such ALM instructions. Upon determination of the eligibility, the compiler device 100 blockifies the ALM instructions as described in block 508. Thus, each ALM instruction in the first IR code 154 is analysed and blockified based on the eligibility in a continuous process until all the ALM instructions are analysed. For example, if the compiler device 100 determines that more ALM instructions are available in the sequence as mentioned at block 510, then the analysis is continued for rest of the ALM instructions along the YES path to block 506. If there are no ALM instructions available for analysis, then the method proceeds to block 512 along the NO path. At block 512, the STORE instructions of the input IR code are analysed for blockification eligibility and upon determining as eligible, the compiler device 100 blockifies the STORE instruction groups at block 514.

Figure 6:
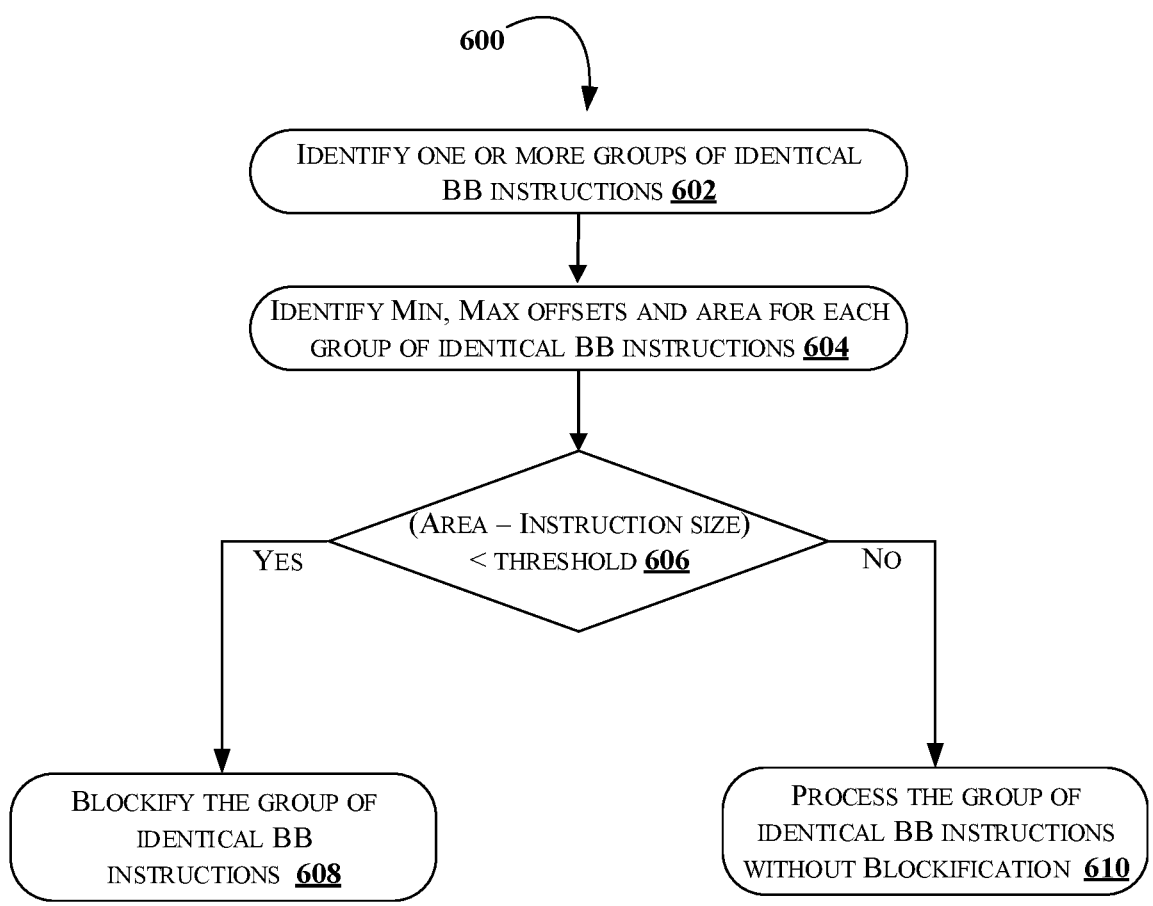
FIG. 6 illustrates a flowchart of an exemplary method of analysis in the process of blockification in accordance with some embodiments of the present disclosure.

FIG. 6 illustrates an exemplary method of analysis for blockifying identical BB instructions in accordance with some embodiments of the present disclosure.

At block 602, the one or more groups of identical BB instructions are identified by the analysis module 332. The analysis module 332 is configured to identify one or more group of identical BB instructions based on BB instruction identifier and allotted buffer. In one embodiment, BB identifier can be at least one of LOAD identifier, ALM identifier, and STORE identifier.

At block 604, a minimum offset and a maximum offset for each group of identical BB instructions are identified and an area for each group of identical BB instructions is computed based on the minimum offset and the maximum offset identified. The computation module 334 is configured to identify a minimum offset and a maximum offset for each group of identical BB instructions and computes an area for each group of identical BB instructions based on the identified minimum offset and maximum offset.

At block 606, criteria for blockification is determined when a difference between the computed area and a total number of identical BB instructions in each group is less than a threshold. In one embodiment, if the criteria is determined, then the method proceeds along the YES path to block 608 for blockification of identical BB instructions. Otherwise, the method proceeds along the NO path to block 610 for processing of the identical BB instructions without blockification.

At block 608, a second intermediate representation code is generated by blockification of at least one of one or more groups of identical BB instructions in the first intermediate representation code when the criteria for blockification is satisfied.

At block 610, the group of identical BB instructions are processed without blockification. The method 600 is repeated for all blocks till all the groups of identical BB instructions are processed.

Example 1

In one example, a source code is designed to read 4 elements with dynamic offset 'a' from the two different 1-dimensional (1D) input images and add each element of the input images and multiply each element resultant image with a third 1D input image element and further write the result to a 1D output buffer. Each element of the mentioned first and second image is represented with one varying co-ordinates. The source code for the implementing the solution of the above said example scenario can contain 4 read statements for the first image, 4 read statement for the second image, 4 addition statement, 4 read statement for the third image, 4 multiply statement, and 4 write statement for writing the result. Upon compilation of the above said source code, an intermediate representation (IR) code is generated which basically represents the aforementioned source code in terms of basic block (BB) instructions. The generated IR code similarly contains 4 LOAD instructions for first image, 4 LOAD instructions for second image, 4 ADD instructions for addition, 4 LOAD instructions for third image, 4 MUL instructions for multiplication, and 4 STORE instructions for write the result to the buffer register.

IR Code of LOAD Instructions:
% vreg7<def> [[0,0],[1,1],1]=SLOAD_1D % vreg2 [[3,0], [1,1],1], 0, 0; 116ScalarRegs:% vreg7 INPUTRegs:% vreg2
% vreg13<def> [[0,0],[1,1],1]=SLOAD_1D % vreg2 [[2,0], [1,1],1], 0, 0; 116ScalarRegs:% vreg13 INPUTRegs:% vreg2
% vreg19<def> [[0,0],[1,1],1]=SLOAD_1D % vreg2 [[1,0], [1,1],1], 0, 0; 116ScalarRegs:% vreg19 INPUTRegs:% vreg2
% vreg31<def> [[0,0],[1,1],1]=SLOAD_1D % vreg2 [[0,0], [1,1],1], 0, 0; 116ScalarRegs:% vreg31 INPUTRegs:% vreg2

1D Blockified LOAD Instruction:
% vreg7<def> [[0,0],[4,1],1]=SLOAD_1D % vreg2 [[0,0], [4,1],1], 0, 0; 116ScalarRegs:% vreg7 INPUTRegs: % vreg2

In the aforementioned code snippets, a typical example of 1D vectorization has been illustrated where each basic block (BB) instructions are analysed and identical BB instructions i.e. LOAD related to the first image read, are grouped based on the analysis. The analysis process determines the minimum offset and the maximum offset of the group of BB instructions. In the foregoing example the minimum offset and maximum offset are 0 and 3 respectively.

Therefore, the determined area of the group of LOAD instructions is 4. Upon comparing the area with the number of instructions in the group and when the difference between the area and the instruction size is less than a predefined threshold according to the described method in FIG. 6, the blockification eligibility of the group of LOAD instructions is established. Thus, the 4 identical LOAD instructions have been optimized to a single SIMD instruction by using one dimensional vectorization where the SIMD instruction enables the executable code to utilize the capacity of SIMD processor and demonstrate enhanced efficiency in terms of execution time, memory consumption etc.

Accordingly, all the 12 read instructions of the foregoing example are mapped to 3 SIMD instructions and 4 BB instructions of addition and 4 BB instructions of multiplication are further assessed through the analysis process. Upon analysing the respective parameter such as minimum offset, maximum offset and area, the addition and multiplication BB instructions are translated to one SIMD instruction for addition and one SIMD instruction for multiplication as depicted below.

IR code of ADD instructions:
% vreg30<def> [[0,0],[1,1],1]=BSSADDrr % vreg8 [[0,0], [1,1],1], % vreg24 [[0,0],[1,1],1]; 116ScalarRegs: % vreg30, % vreg8,% vreg24
% vreg33<def> [[0,0],[1,1],1]=BSSADDrr % vreg8 [[1,0], [1,1],1], % vreg24 [[1,0],[1,1],1]; 116ScalarRegs: % vreg33, % vreg8,% vreg24
% vreg35<def> [[0,0],[1,1],1]=BSSADDrr % vreg8 [[2,0], [1,1],1], % vreg24 [[2,0],[1,1],1]; 116ScalarRegs: % vreg35, % vreg8,% vreg24
% vreg37<def> [[0,0],[1,1],1]=BSSADDrr % vreg8 [[3,0], [1,1],1], % vreg24 [[3,0],[1,1],1]; 116ScalarRegs: % vreg37, % vreg8,% vreg24

1D Blockified ADD Instruction:
% vreg30<def> [[0,0],[4,1],1]=BSSADDrr % vreg8 [[0,0], [4,1],1], % vreg24 [[0,0],[4,1],1]; 116ScalarRegs: % vreg30, % vreg8, % vreg24

IR Code of MULTIPLY Instructions:
% vreg32<def> [[0,0],[1,1],1]=BSSMULrr % vreg7 [[0,0], [1,1],1], % vreg30<kill> [[0,0],[1,1],1]; 116ScalarRegs: % vreg32, % vreg7, % vreg30
% vreg34<def> [[0,0],[1,1],1]=BSSMULrr % vreg7 [[1,0], [1,1],1], % vreg33<kill> [[0,0],[1,1],1]; 116ScalarRegs: % vreg34, % vreg7, % vreg33
% vreg36<def> [[0,0],[1,1],1]=BSSMULrr % vreg7 [[2,0], [1,1],1], % vreg35<kill> [[0,0],[1,1],1]; 116ScalarRegs: % vreg36, % vreg7, % vreg35
% vreg38<def> [[0,0],[1,1],1]=BSSMULrr % vreg7 [[3,0], [1,1],1], % vreg37<kill> [[0,0],[1,1],1]; 116ScalarRegs: % vreg38, % vreg7, % vreg37

1D Blockified MULTIPLY Instruction:
% vreg32<def> [[0,0],[4,1],1]=BSSMULrr % vreg7 [[0,0], [4,1],1], % vreg30 [[0,0],[1,1],1]; 116ScalarRegs: % vreg38, % vreg7, % vreg30

Again, the 4 identical STORE instructions are transformed to one SIMD instruction based upon the analysis of the 4 BB instructions.

IR code of STORE Instructions:
SSTORE_1D % vreg32 [[0,0],[1,1],1], % vreg4 [[0,0],[1, 1],1], 0, 0; 116ScalarRegs:% vreg32 OUTPUTRegs:% vreg4
SSTORE_1D % vreg32 [[1,0],[1,1],1], % vreg4 [[1,0],[1, 1],1], 0, 0; 116ScalarRegs:% vreg32 OUTPUTRegs:% vreg4
SSTORE_1D % vreg32 [[2,0],[1,1],1], % vreg4 [[2,0],[1, 1],1], 0, 0; 116ScalarRegs:% vreg32 OUTPUTRegs:% vreg4
SSTORE_1D % vreg32 [[3,0],[1,1],1], % vreg4 [[3,0],[1, 1],1], 0, 0; 116ScalarRegs:% vreg32 OUTPUTRegs:% vreg4

1D Blockified STORE Instruction:
SSTORE_1D % vreg32 [[0,0],[4,1],1], % vreg4 [[0,0],[4, 1],1], 0, 0; 116ScalarRegs:% vreg32 OUTPUTRegs:% vreg4

Therefore, 24 BB instructions are optimized to 6 blockified SIMD instructions by using the blockification technique where the 6 SIMD instructions are transmitted to an executable target code which establishes better efficiency upon execution.

Example 2

In another example, a source code is designed to read 4 elements from the two different input images and add each element of the input images and multiply each element of resultant image with a third input image element and further write the result to one output buffer at 4 neighbouring pixel regions. Each element of the aforementioned images is represented as two varying co-ordinates. Thus, the optimization process of the present invention implements two-dimensional vectorization for better efficiency. The source code for the implementing the solution of the above said problem can contain 4 read statements for the first image, 4 read statement for the second image, 4 addition statement, 4 read statement for the third image, 4 multiply statement, and 4 write statement for writing the result. Upon compilation of the above said source code, an intermediate representation (IR) code is generated which basically represents the aforementioned source code in terms of basic block (BB) instructions. The generated IR code similarly contains 4 LOAD instructions for first image, 4 LOAD instructions for second image, 4 ADD instructions for addition, 4 LOAD instructions for third image, 4 MUL instructions for multiplication, and 4 STORE instructions for write the result to the buffer register.

IR code of READ Instructions:

% vreg8<def> [[0,0],[1,1],1]=SLOAD_2D % vreg2 [[1,1],[1,1],1], 0, 0; 116ScalarRegs:% vreg8 INPUTRegs:% vreg2

% vreg11<def> [[0,0],[1,1],1]=SLOAD_2D % vreg2 [[1,0],[1,1],1], 0, 0; 116ScalarRegs:% vreg11 INPUTRegs:% vreg2

% vreg14<def> [[0,0],[1,1],1]=SLOAD_2D % vreg2 [[0,1],[1,1],1], 0, 0; 116ScalarRegs:% vreg14 INPUTRegs:% vreg2

% vreg20<def> [[0,0],[1,1],1]=SLOAD_2D % vreg2 [[0,1],[1,1],1], 0, 0; 116ScalarRegs:% vreg20 INPUTRegs:% vreg2

2D Blockified LOAD Instruction:

% vreg8<def> [[0,0],[2,2],1]=SLOAD_2D % vreg2 [[0,0],[2,2],1], 0, 0; 116ScalarRegs:% vreg8 INPUTRegs:% vreg2

In the exemplified code snippets, a typical example of 2D vectorization has been illustrated where each basic block (BB) instructions are analysed and identical BB instructions i.e. LOAD related to the first image read, are grouped based on the analysis. The analysis process determines the minimum offset and the maximum offset of the group of BB instructions. In the foregoing example the minimum offset and maximum offset are determined individually for two different dimensions which are two different co-ordinates of the elements and the determined minimum and maximum offset for both the dimensions are 0 and 1 respectively. Therefore, the determined area of group of LOAD instructions is 4. Upon comparing the area with the number of instructions in the group and when the difference between the area and the instruction size is less than a predefined threshold according to the described method in FIG. 6, the blockification eligibility of the group of LOAD instructions is established. Thus, the 4 identical LOAD instructions have been optimized to a single SIMD instruction by using two-dimensional vectorization where the SIMD instruction can be executed by the transformed executable code to utilize the parallel processing capacity of SIMD processor and demonstrate higher efficiency in terms of execution time, memory consumption etc.

Accordingly, all the 12 read instructions of the foregoing example are mapped to 3 SIMD instructions and 4 BB instructions of addition and 4 BB instructions of multiplication are further assessed through the analysis process. Upon analysing the respective parameter such as minimum offset, maximum offset and area, the addition and multiplication BB instructions are translated to one two-dimensional vectorized SIMD instruction for addition and one two-dimensional vectorized SIMD instruction for multiplication as depicted below.

IR code of ADD Instructions:

% vreg19<def> [[0,0],[1,1],1]=BSSADDrr % vreg9 [[0,0],[1,1],1], % vreg10 [[0,0],[1,1],1]; 116ScalarRegs: % vreg19,% vreg9,% vreg10

% vreg22<def> [[0,0],[1,1],1]=BSSADDrr % vreg9 [[0,1],[1,1],1], % vreg10 [[0,1],[1,1],1]; 116ScalarRegs: % vreg22,% vreg9,% vreg10

% vreg24<def> [[0,0],[1,1],1]=BSSADDrr % vreg9 [[1,0],[1,1],1], % vreg10 [[1,0],[1,1],1]; 116ScalarRegs: % vreg24,% vreg9,% vreg10

% vreg26<def> [[0,0],[1,1],1]=BSSADDrr % vreg9 [[1,1],[1,1],1], % vreg10 [[1,1],[1,1],1]; 116ScalarRegs: % vreg26,% vreg9,% vreg10

2D Blockified ADD Instruction:

% vreg19<def> [[0,0],[2,2],1]=BSSADDrr % vreg9 [[0,0],[2,2],1], % vreg10 [[0,0],[2,2],1]; 116ScalarRegs: % vreg19,% vreg9,% vreg10

IR code of MULTIPLY Instructions:

% vreg21<def> [[0,0],[1,1],1]=BSSMULrr % vreg8 [[0,0],[1,1],1], % vreg19<kill> [[0,0],[1,1],1]; 116ScalarRegs:% vreg21, % vreg8, % vreg19

% vreg23<def> [[0,0],[1,1],1]=BSSMULrr % vreg8 [[0,1],[1,1],1], % vreg22<kill> [[0,0],[1,1],1]; 116ScalarRegs:% vreg23, % vreg8, % vreg22

% vreg25<def> [[0,0],[1,1],1]=BSSMULrr % vreg8 [[1,0],[1,1],1], % vreg24<kill> [[0,0],[1,1],1]; 116ScalarRegs:% vreg25, % vreg8, % vreg24

% vreg27<def> [[0,0],[1,1],1]=BSSMULrr % vreg8 [[1,1],[1,1],1], % vreg26<kill> [[0,0],[1,1],1]; 116ScalarRegs:% vreg27, % vreg8, % vreg26

2D Blockified MULTIPLY Instruction:

% vreg21<def> [[0,0],[2,2]1]=BSSMULrr % vreg8 [[0,0],[2,2],1], % vreg19 [[0,0],[2,2],1]; 116ScalarRegs: % vreg21, % vreg8, % vreg19

Again, the 4 identical STORE instructions are transformed to one two-dimensional vectorized SIMD instruction based upon the analysis of the 4 BB instructions.

IR code of STORE Instructions:

SSTORE_2D % vreg21 [[0,0],[1,1],1], % vreg3 [[0,0],[1,1],1] 0, 0; 116ScalarRegs:% vreg21 OUTPUTRegs:% vreg3

SSTORE_2D % vreg21 [[0,1],[1,1],1], % vreg3 [[0,1],[1,1],1] 0, 0; 116ScalarRegs:% vreg21 OUTPUTRegs:% vreg3

SSTORE_2D % vreg21 [[1,0],[1,1],1], % vreg3 [[1,0],[1,1],1] 0, 0; 116ScalarRegs:% vreg21 OUTPUTRegs:% vreg3

SSTORE_2D % vreg21 [[1,1],[1,1],1], % vreg3 [[1,1],[1,1],1] 0, 0; 116ScalarRegs:% vreg21 OUTPUTRegs:% vreg3

2D Blockified STORE Instruction:

SSTORE_2D % vreg21 [[0,0],[2,2],1], % vreg3 [[0,0],[2,2],1], 0, 0; 116ScalarRegs:% vreg21 OUTPUTRegs: % vreg3

Therefore, 24 BB instructions are optimized to 6 blockified SIMD instructions by using the blockification technique where the 6 SIMD instructions are transmitted to an executable target code which establishes better efficiency upon execution.

Following table 1 shows improvement in performance of the computer program as explained in example 2 with and without blockification optimization.

|  | With Blockification | Without Blockification |
|---|---|---|
| Time | 0.01260 ms | 0.02566 ms |
| Total number of instructions | 8 | 25 |
| Read/write Bandwidth | 0.00916 MB | 0.00946 MB |
| ALU efficiency | 1.90401 | 0.3118 |
| Frames per sec (FPS) | 79333.59778 | 38974.95859 |
| Execution clocks | 20168 | 41052 |

Hence, the problem with the existing optimization techniques in the art is alleviated by the method described in the foregoing disclosure of the instant invention.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. A computer implemented method for enhancing compilation of source code, the method comprising:

receiving a first intermediate representation code of the source code as input data, wherein the first intermediate representation code comprises a plurality of basic block (BB) instructions generated from the corresponding source code;

analyzing each of the plurality of BB instructions to determine one or more groups of identical BB instructions that satisfy at least one criteria for blockification;

generating, based on the determination, a second intermediate representation code by blockification of at least one of one or more groups of identical BB instructions in the first intermediate representation code; and compiling the second intermediate representation code to obtain a corresponding enhanced executable code for executing the source code;

wherein the step of blockification comprises merging of the at least one of one or more groups of identical BB instructions using one of one-dimensional Single Instruction Multiple Data (SIMD) vectorization and two-dimensional SIMD vectorization;

wherein merging the at least one of one or more groups of identical BB instructions comprises generating one or more vector instructions for each group of identical instructions using one of one-dimensional SIMD vectorization and two-dimensional SIMD vectorization; and wherein generating the one or more vector instructions comprises generating the one or more vector instructions based on SIMD width of a vector register.

2. The computer implemented method of claim 1, wherein determining one or more groups of identical BB instructions that satisfy at least one criteria for blockification, comprises:

identifying a minimum offset and a maximum offset for each group of identical BB instructions, wherein each group of identical BB instructions is identified based on instruction identifier and allotted buffer;

computing an area for each group of identical BB instructions based on the minimum offset and the maximum offset identified; and determining that each group of identical BB instructions satisfies the criteria for blockification when a difference between the computed area and a total number of identical BB instructions in each group is less than a threshold.

3. The computer implemented method of claim 1, wherein each BB instruction is one of LOAD, Arithmetic Logic and Multiply (ALM), and STORE instructions, wherein the instruction identifier is at least one of LOAD, ALM, and STORE identifier.

4. A device to enhance compilation of source code, the device comprising:

a memory;

a processor, coupled to the memory, and configured to:

receive a first intermediate representation n code of the source code as input data, wherein the first intermediate representation code comprises a plurality of basic block (BB) instructions generated from the corresponding source code;

analyze each of the plurality of BB instructions to determine one or more groups of identical BB instructions that satisfy at least one criteria for blockification;

generate, based on the determination, a second intermediate representation code by blockification of at least one of one or more groups of identical BB instructions in the first intermediate representation code; and compile the second intermediate representation code to obtain a corresponding enhanced executable code for executing the source code;

wherein the step of blockification includes merge the at least one of one or more groups of identical BB instructions using one of one-dimensional Single Instruction Multiple Data (SIMD) vectorization and two-dimensional SIMD vectorization;

wherein to merge the at least one of one or more groups of identical BB instructions, the processor is configured to generate one or more vector instruction for each group of identical instructions using one of one-dimensional single instruction multiple data (SIMD) vectorization and two-dimensional SIMD vectorization;

wherein the generation of the one or more vector instructions comprises generating the one or more vector instructions based on SIMD width of a vector register.

5. The device of claim 4, wherein to determine one or more groups of identical BB instructions that satisfy at least one criteria for blockification, the processor is configured to:

identify a minimum offset and a maximum offset for each group of identical BB instructions, wherein each group of identical BB instructions is identified based on instruction identifier and allotted buffer;

compute an area for each group of identical BB instructions based on the minimum offset and the maximum offset identified; and determine that each group of identical BB instructions satisfies the criteria for blockification when a difference between the computed area and a total number of identical BB instructions in each group is less than a threshold.

6. The processing device of claim 4, wherein each BB instructions is one of LOAD, Arithmetic Logic Multiply (ALM), and STORE instructions.

7. A non-transitory computer-readable storage medium that stores instructions executable by a computer that, in response to execution by the computer, cause the computer to perform or control performance of operations comprising:

receive a first intermediate representation code of the source code as input data, wherein the first intermediate representation code comprises a plurality of basic block (BB) instructions generated from the corresponding source code;

analyze each of the plurality of BB instructions to determine one or more groups of identical BB instructions that satisfy at least one criteria for blockification;

generate, based on the determination, a second intermediate representation code by blockification of at least one of one or more groups of identical BB instructions in the first intermediate representation code; and compile the second intermediate representation code to obtain a corresponding enhanced executable code for executing the source code;

wherein the operations for blockification comprises at least one operation to merge the at least one of one or more groups of identical BB instructions using one of one-dimensional single instruction multiple data (SIMD) vectorization and two-dimensional SIMD vectorization;

wherein the operations to merge the at least one of one or more groups of identical BB instructions comprises at least one operations to generate one or more vector instructions by converting each group of identical instructions using one of one-dimensional SIMD vectorization and two-dimensional SIMD vectorization;

wherein the operation to generate the one or more vector instructions comprises generating one or more vector instructions based on SIMD width of a vector register.

8. The non-transitory computer-readable storage medium of claim 7, wherein the operation to determine one or more groups of identical BB instructions that satisfy at least one criteria for blockification comprises:

identify a minimum offset and a maximum offset for each group of identical BB instructions, wherein each group of identical BB is identified based on instruction identifier and allotted buffer;

compute an area for each group of identical BB instructions based on the minimum offset and the maximum offset identified; and determine that each group of identical BB instructions satisfies the criteria for blockification when a difference between the computed area and a total number of identical BB instructions in each group is less than a threshold.

9. The non-transitory computer-readable storage medium of claim 7, wherein each BB instruction is one of LOAD, Arithmetic Logic Multiply (ALM), and STORE instructions.

* * * * *